United States Patent [19]

Favron

[11] 4,073,084
[45] Feb. 14, 1978

[54] ARTIFICIAL BAIT FOR FISHING

[75] Inventor: Sergio Favron, Milan, Italy

[73] Assignee: Giancarlo de Taddeo, Milan, Italy

[21] Appl. No.: 676,709

[22] Filed: Apr. 14, 1976

[30] Foreign Application Priority Data

Apr. 23, 1975 Italy .............................................21300

[51] Int. Cl.² .............................................. A01K 85/00
[52] U.S. Cl. .................................. 43/42.35; 43/42.36; 43/42.39
[58] Field of Search .................. 43/42.35, 42.39, 42.36

[56] References Cited
U.S. PATENT DOCUMENTS

| 963,202 | 7/1910 | Bohannan | 43/42.35 |
| 2,270,487 | 1/1942 | Withey | 43/42.35 |
| 2,563,386 | 8/1951 | Wight, Jr. | 43/42.36 |
| 3,393,466 | 7/1968 | LeMaster | 43/42.35 |
| 3,497,987 | 3/1970 | Perrin | 43/42.39 |

Primary Examiner—Warner H. Camp
Attorney, Agent, or Firm—Max Fogiel

[57] ABSTRACT

An artificial bait for fishing formed of two half-shells made of plastics and welded to each other. The half-shells form two watertight chambers divided by a wall extending along the full length of the bait and embedding a longitudinal metal element projecting from the bait ends for securing a fishhook and a control fishing-line to it.

The watertight chamber provided in the top portion of the bait is air-filled while the watertight chamber formed in the bottom portion of the same bait is filled with a metal ballast anchored to the two half-shells.

9 Claims, 6 Drawing Figures

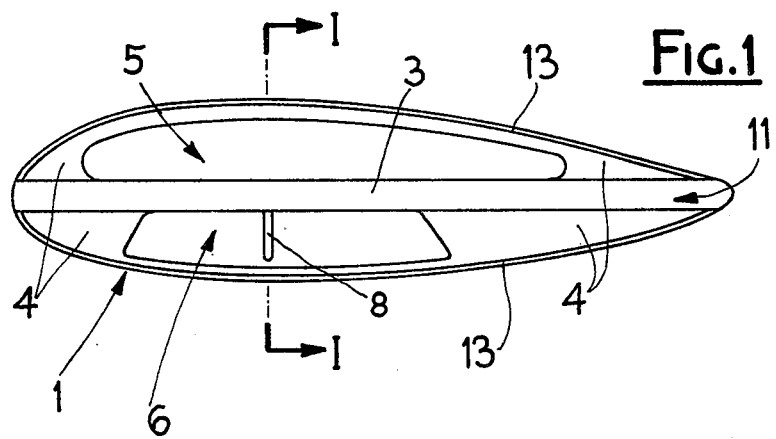
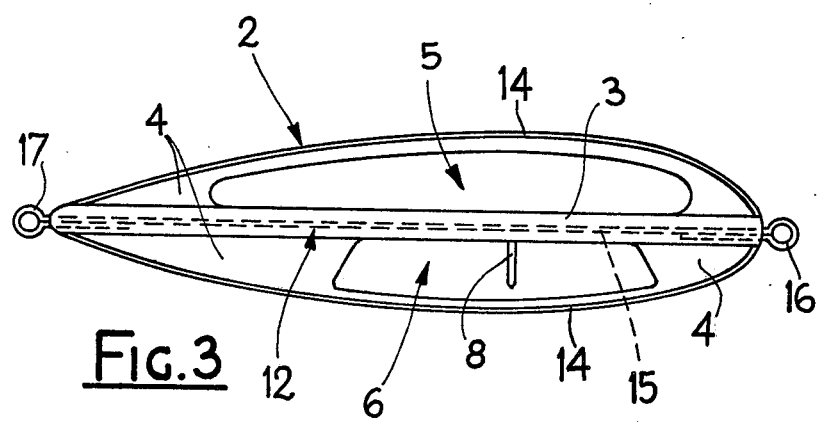
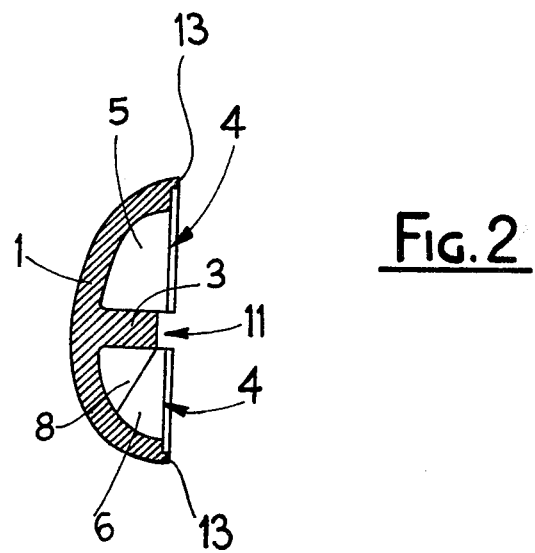

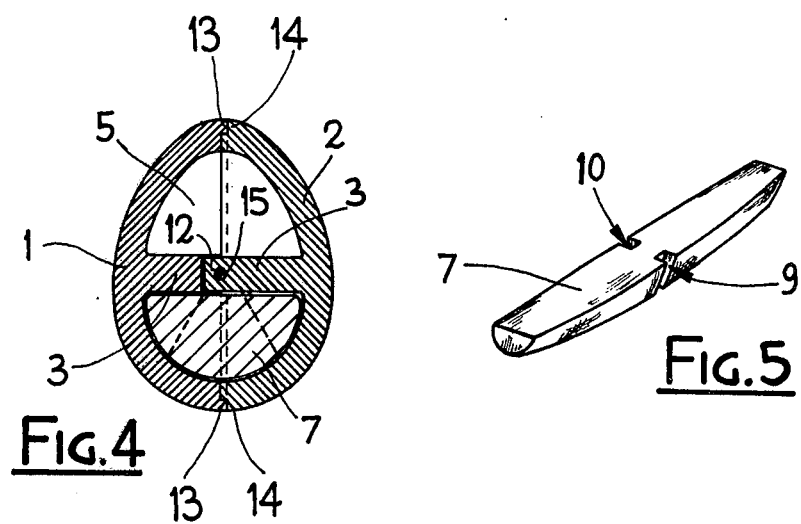
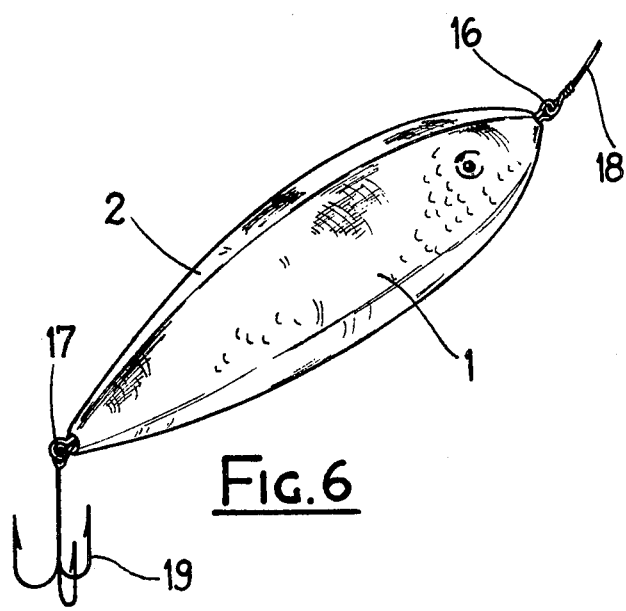

ARTIFICIAL BAIT FOR FISHING

This invention relates to an artificial bait particularly for throw fishing for any type of fish, even quite sturdy fish, such as for example pike, trout and general sea fish.

At present commercially available artificial baits are substantially entirely or partially made of balsa wood which, as well known, ensures a very good floating to the bait. However, said approaches have some disadvantages restricting the quality and use thereof, such as for example the fragility of the structure thereof. This is the reason why it often occurs that fishing-lines, as violently bitten by a biting fish, would break releasing the fish from capture, and at the same time excluding any possibility of use thereof. Additionally, because of being always immersed in water, they get very quickly spoiled, as from the small unavoidable scratches on the wood covering paint, or from the connection zones between the wood and other materials, water seeps through gradually swelling and impairing or deteriorating the wood, and accordingly irreparably changing the shape and operation of the bait.

A further disadvantage is that the balsa wood processing is extremely delicate, whereby extreme care is required in providing the details and assembling thereof, which operations are quite time consuming and expensive.

It is the object of the present invention to provide an artificial bait which is suitable for throw fishing, resistant to the set of teeth of moderate size fish, and overcoming the disadvantages above mentioned.

It is another object of the present invention to provide an artificial bait, the main components of which, instead of being made of balsa wood, are made of mold castable and injectable material, such as resins or general plastic materials, highly resistant to water action, and readily moldable to the desired shape and size.

It is a further object of the present invention to provide an artificial bait of a very low cost having production and exhibiting at the same time very good use performances, ensuring the possibility or capability for travelling during retrieval, under water, at the surface of the water, or even out of the water, at a perfectly horizontal position lengthwise and at a vertical position in transverse direction, which positions simulate at any time the normal position of a true fish.

These and other objects are accomplished by an artificial bait comprising two half-shells sealed or welded together and made of synthetic resins and like materials, and inside of which two chambers are provided and separated by a projecting internal transverse wall, forming a top air-filled watertight chamber and a bottom watertight chamber filled with metal ballast, one of the half-shells being also provided with a longitudinal metal element embedded therein and terminating at its ends with two projecting annular elements, to which at least one fishhook and one control fishing-line are applied, respectively.

The features of the artificial bait according to the present design will be more clearly understood from the following description of a preferred embodiment thereof, reference being had to the accompanying drawings in which:

FIG. 1 is a side view showing the first half-shell;
FIG. 2 is a cross-sectional view of said first half-shell taken along line I—I of FIG. 1;
FIG. 3 is a side view showing the second half-shell;
FIG. 4 is a cross-sectional view showing the two half-shells as coupled and sealed or welded to each other;
FIG. 5 is a perspective view of the metal ballast; and
FIG. 6 is a perspective full view showing a complete artificial bait as ready for use.

As it will be seen from said figures of the drawings half-shells 1 and 2 are substantially shaped on the outside to imitate one half of an actual fish, while being internally formed with two substantially adjacent cavities.

These cavities are lengthwise separated by a longitudinal wall 3 extending to the central joining plane 4.

By said wall 3, the bait interior is divided into two distinct watertight chambers 5 and 6, of which the upper chamber 5, upon sealing or welding completion of half-shells 1 and 2, remains merely filled with air, while lower chamber 6 encloses therein a ballast 7 held in place by side projections 8.

Said projections 8 are formed in lower chamber 6 and are located transversely of the chamber to be pressure inserted during assembling of half-shells 1 and 2 into corresponding grooves 9 and 10 formed on the sides of said ballast 7.

In order to improve the connection of half-shells 1 and 2, centrally and longitudinally thereof a simple step joint has been provided, and namely, the embedded female joint portion 11 is formed on half-shell 1, while the corresponding projecting male portion 12 is formed on half-shell 2.

Similarly, also the peripheral edges of the half-shells are interconnected by centering on shaped outlines 13 and 14.

Alongside projecting portion 12 of half-shell 2, during the initial forming step, a longitudinal metal element 15 is embedded therein so as to be substantially coincident with the vertical axis of symmetry of the bait.

At the ends projecting from the bait, said element 15 is bent to form two rings 16 and 17, on which fishing-line and at least one single or multipointed fishhook 19 are secured.

From the foregoing, the structural simplicity of the bait and its completely reliable operation will be evident, and this owing to the particular internal division thereof, substantially comprising at the top a chamber (the fish back) acting as horizontal stabilizing float, and a second lower chamber (the fish stomach) having the capability of containing such an amount of ballast as to deep sink the bait, or conversely, to cause the bait during water retrieval to travel at a constant level and at a desired depth depending on the amount of ballast preinserted in the bait when sealing or welding said two half-shells.

Thus, baits can be provided as capable of travelling at water surface, still remaining at horizontal attitude.

This gives a fisher or angler a complete range of baits for any type of fishing, both river and sea fishing.

Such an arrangement imposes to a water-immersed bait a constant perfectly lengthwise horizontal position and a constant perfectly vertical position in transverse direction. This is an evident likeness to the position of an actual fish moving in its natural environment.

Of course, as in all of the baits presently used by fishers or anglers, the present bait will be covered with the colors and all of the required patterns to make it more or less similar to the type of natural bait intended to be imitated.

What I claim is:

1. An artificial bait comprising: two half-shells joined to each other; an interior separating wall forming two separate chambers with the interior walls of said half-shells; transverse projection means in one of said chambers; a ballast weight member with recesses receiving said projection means, said projection means holding said weight member in clamped position in said one chamber when inserted into said recesses, said ballast weight member being insertable into said one chamber and engaging clampingly said projection means for applying to said chamber ballast weight, said weight member being variable in weight dependent on the length of said weight member; a longitudinal rod-shaped element embedded along its length in a portion of one of said half-shells and having ends projecting to the exterior of said one half-shell from the ends of a longitudinal axis through said one half-shell, said ends of said rod-shaped element being substantially ring-shaped, one of said ring-shaped ends being connectable to fish hook means and the other ring-shaped end being connectable to control fishing-line means.

2. The artificial bait as defined in claim 1 wherein said weight member comprises a bar-shaped member with said recesses on the lengthwise sides of said bar-shaped member, said transverse projection means extending into said recesses.

3. The artificial bait as defined in claim 1 wherein said separating wall is comprised of a central portion joined to the wall of one of said half-shells and extending past a central plane of symmetry passing through said longitudinal axis, the other one of said half-shells having a central portion with a recess mating with said first-mentioned central portion to form said separating wall, said longitudinal rod-shaped element being embedded in said first-mentioned central portion of said one half-shell.

4. The artificial bait as defined in claim 1 wherein said half-shells have joint surfaces comprising a rim portion connecting with a recessed area on one surface and a corresponding recessed portion and raised portion on the other surface for mating respectively with said rim portion and recessed area.

5. The artificial bait as defined in claim 1 wherein said half-shells are comprised of plastic material.

6. The artificial bait as defined in claim 1 wherein one of said chambers comprises an upper chamber filled with air, the other chamber comprising a lower chamber holding said weight member.

7. The artificial bait as defined in claim 1 wherein said weight is comprised of metal.

8. The artificial bait as defined in claim 1 wherein said rod-shaped element is comprised of metal.

9. The artificial bait as defined in claim 1 wherein said weight member comprises a bar-shaped member having elongated tapering sides conforming to the contour of a fish, the width of said bar-shaped member being substantially maximum in proximity of said recesses, the width of said bar-shaped member being substantially minimum at the ends thereof, said recesses being located on the lengthwise sides of said bar-shaped member, said projection means extending transversely into said recesses of said bar-shaped member, said separating wall comprising a first central portion joined to the wall of one of said half-shells and extending past a plane of symmetry passing through said longitudinal axis, the other one of said half-shells having a second central portion with a recess mating with said first central portion to form said separating wall, said longitudinal rod-shaped element being embedded in said first central portion of said one half-shell, said half-shells being comprised of plastics, said half-shells having joint surfaces with one surface having a rim portion and a recessed area mating with a respective recessed portion and a raised area, one of said chambers comprising an upper chamber filled with air and the other chamber comprising a lower chamber holding said weight member, said weight member and said rod-shaped element being comprised of metal.

* * * * *